US012080960B2

(12) United States Patent
Magray et al.

(10) Patent No.: US 12,080,960 B2
(45) Date of Patent: Sep. 3, 2024

(54) WIDEBAND MILLIMETER-WAVE ANTENNA DEVICE

(71) Applicant: ASUSTeK COMPUTER INC., Taipei (TW)

(72) Inventors: Muhammad Idrees Magray, Taipei (TW); Saou-Wen Su, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 122 days.

(21) Appl. No.: 17/987,908

(22) Filed: Nov. 16, 2022

(65) Prior Publication Data

US 2023/0420849 A1 Dec. 28, 2023

(30) Foreign Application Priority Data

Jun. 24, 2022 (TW) ................................. 111123767

(51) Int. Cl.

*H01Q 9/04* (2006.01)
*H01Q 1/24* (2006.01)
*H01Q 1/42* (2006.01)
*H01Q 13/08* (2006.01)

(52) U.S. Cl.

CPC ........... *H01Q 9/0407* (2013.01); *H01Q 1/425* (2013.01); *H01Q 13/08* (2013.01)

(58) Field of Classification Search

CPC ...... H01Q 9/0407; H01Q 1/425; H01Q 13/08; H01Q 1/24; H01Q 1/243; H01Q 5/385; H01Q 15/006

See application file for complete search history.

(56) References Cited

FOREIGN PATENT DOCUMENTS

| | | | | |
|---|---|---|---|---|
| CN | 112886231 A | 6/2021 | | |
| CN | 113451760 A | 9/2021 | | |
| CN | 113825858 A | 12/2021 | | |
| KR | 2130312 B1 * | 7/2020 | ........... | H01Q 3/2605 |
| WO | WO-2021104076 A1 * | 6/2021 | ............... | H01Q 1/38 |
| WO | WO-2022050606 A1 * | 3/2022 | ............. | H01Q 1/242 |

* cited by examiner

*Primary Examiner* — Hoang V Nguyen

(74) *Attorney, Agent, or Firm* — McClure, Qualey & Rodack, LLP

(57) ABSTRACT

A wideband millimeter-wave antenna device includes an antenna radiation layer and a transparent metasurface layer. The antenna radiation layer is below a transparent panel of a display panel and maintains a spaced height from the transparent panel. The transparent metasurface layer is on an upper surface of the transparent panel. The antenna radiation layer includes a dielectric substrate, a radiating metal portion, and a ground plane. The dielectric substrate is below the transparent panel and includes a first surface and a second surface, and the first surface faces the transparent panel. The radiating metal portion is on the first surface. The ground plane is on the second surface. The transparent metasurface layer includes a transparent substrate and metasurface units. The transparent substrate is on the upper surface of the transparent panel. The metasurface units are on the transparent substrate. Each metasurface unit is formed by a diamond-grid metal wire.

12 Claims, 8 Drawing Sheets

WIDEBAND MILLIMETER-WAVE ANTENNA DEVICE

CROSS-REFERENCE TO RELATED APPLICATION

This application claims the priority benefit of Taiwan application serial No. 111123767, filed on Jun. 24, 2022. The entirety of the above-mentioned patent application is hereby incorporated by reference herein and made a part of the specification.

BACKGROUND OF THE INVENTION

Field of the Invention

The disclosure relates to a wideband millimeter-wave (mmWave) antenna device applied to fifth-generation communication (5G communication).

Description of the Related Art

With the advent of fifth-generation communication, millimeter-wave with higher transmission capacity and lower latency has become the focus of development. For modern mobile devices, the shape dimension plays a key role in determining the overall shape and size of the antenna architecture. Nowadays, thin mobile devices are preferred, which makes antenna design more challenging, especially for antenna structure design at millimeter-wave frequencies. The limited space inside the mobile device causes limitations on the design of millimeter-wave 5G antennas.

Antenna-in-package (AiP) and antenna-on-display (AoD) technologies are the best technology choices for 5G millimeter-wave frequencies. In display antenna technology, the overall antenna is implemented on a display with transparent characteristics. In this case, since the antenna radiator is accommodated on the display, most of the space of the antenna inside the mobile device is reserved for other circuits. However, designing optically transparent millimeter-wave antennas on displays has many problems, and low antenna gain and low antenna radiation efficiency are common.

BRIEF SUMMARY OF THE INVENTION

According to an aspect of this disclosure, a wideband millimeter-wave antenna device is provided. The wideband millimeter-wave antenna device includes an antenna radiation layer and a transparent metasurface layer. The antenna radiation layer is located below a transparent panel of a display panel and maintains a spaced height from the transparent panel. The transparent metasurface layer is located on an upper surface of the transparent panel. The antenna radiation layer includes a dielectric substrate, a radiating metal portion, and a ground plane. The dielectric substrate is located below the transparent panel, and includes a first surface and a second surface opposite to each other, so that the first surface faces the transparent panel. The radiating metal portion is located on the first surface. The ground plane is located on the second surface. The transparent metasurface layer includes a transparent substrate and a plurality of metasurface units. The transparent substrate is located on the upper surface of the transparent panel. The metasurface units are located on the transparent substrate. Each metasurface unit is formed by a diamond-grid metal wire.

In summary, the disclosure provides a wideband millimeter-wave antenna device, which reduces the overall dimension of the antenna, and decreases the complexity of shape design using the design concept of a transparent metasurface layer, without affecting radiation characteristics of the antenna. In addition, the entire antenna device has a wider operation bandwidth, and has the best antenna gain and antenna radiation efficiency, to obtain the best antenna characteristics.

DETAILED DESCRIPTION OF THE EMBODIMENTS

Figure 1:
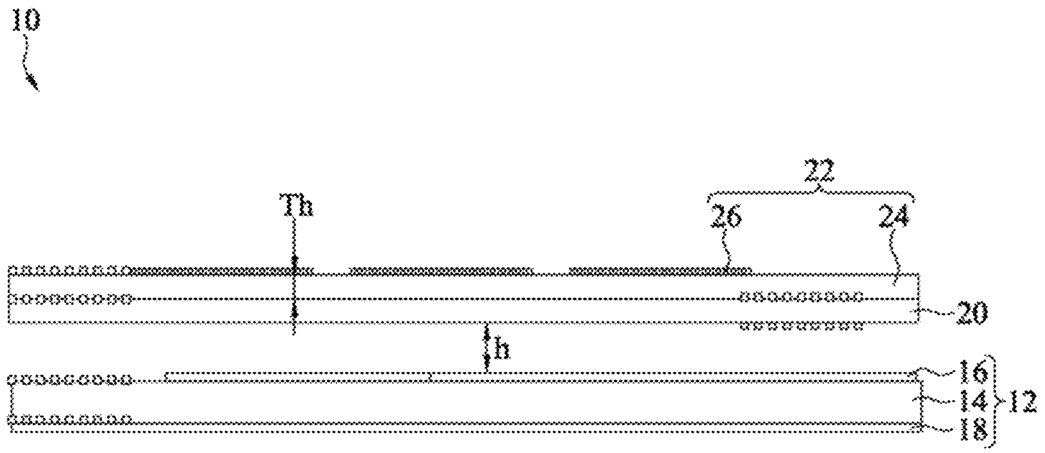
FIG. 1 is a schematic structural diagram of a wideband millimeter-wave antenna device according to an embodiment of the disclosure.

The embodiments of the disclosure are described with reference to relevant drawings. In addition, some elements or structures are omitted in the drawings in the embodiments, to clearly show technical features of the disclosure. In these drawings, the same numerals indicate the same or similar elements or circuits. It is to be noted that, terms such as “first” and “second” are used to describe various elements, components, regions, or structures herein, but the elements, components, regions, and/or structures are not limited to these terms. These terms are only used to distinguish one element, component, region, or structure from another element, component, region, or structure.

Figure 2:
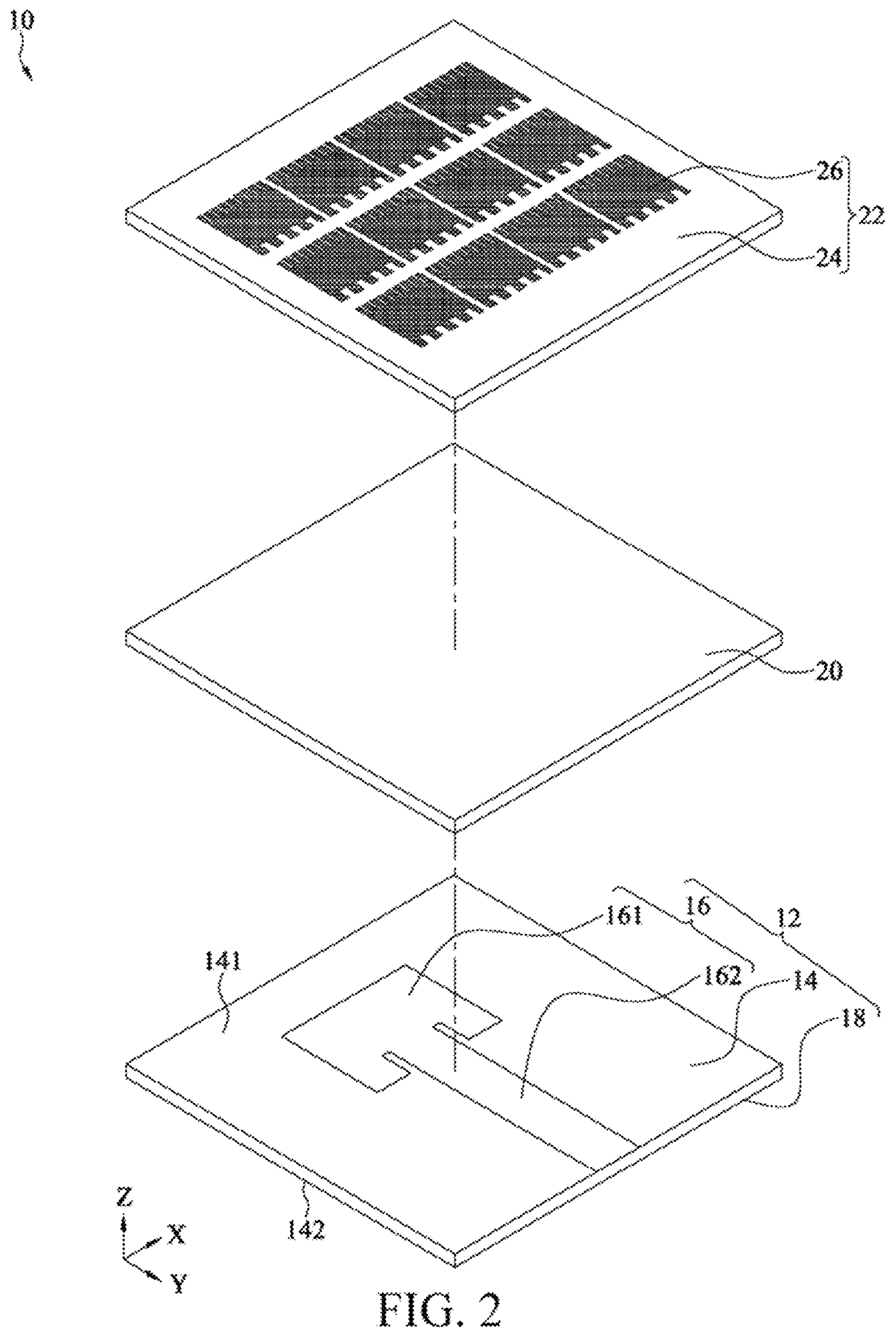
FIG. 2 is a structural exploded view of a wideband millimeter-wave antenna device according to an embodiment of the disclosure.

Referring to FIG. 1 and FIG. 2 together, a wideband millimeter-wave antenna device 10 is disposed in an electronic device. The wideband millimeter-wave antenna device 10 includes an antenna radiation layer 12 and a transparent metasurface layer 22.

The antenna radiation layer 12 is located below a transparent panel 20 of a display panel of the electronic device, and maintains a spaced height h from the transparent panel 20. The spaced height h is adjusted based on an available space inside the electronic device. The antenna radiation layer 12 includes a dielectric substrate 14, a radiating metal portion 16, and a ground plane 18. The dielectric substrate 14 is located below the transparent panel 20. The dielectric substrate 14 includes a first surface 141 and a second surface 142 in parallel opposite to each other, and the first surface 141 faces the transparent panel 20. The radiating metal portion 16 is located on the first surface 141 of the dielectric substrate 14. The radiating metal portion 16 includes a patch radiator 161 and a microstrip feed-in wire 162 connected to the patch radiator 161, to use the patch radiator 161 as a main radiator. The ground plane 18 is located on the second surface 142 of the dielectric substrate 14. The ground plane 18 selectively covers a part of the second surface 142 or covers the entire second surface 142. In this embodiment, the ground plane 18 covering the entire second surface 142 is used as an example.

In an embodiment, the dielectric substrate 14 adopts a printed circuit board (PCB), such as a Rogers RT5880 substrate, which has a feature of low cost. In an embodiment, as shown in FIG. 2, the patch radiator 161, the microstrip feed-in wire 162, the ground plane 18, and the like are made of a conductive material, and the conductive material is silver, copper, iron, aluminum, alloy thereof, or the like. In this embodiment, the patch radiator 161, the microstrip feed-in wire 162, and the ground plane 18 of the disclosure are made of copper metal, which has an electrical conductivity of 5.8*107 S/m. Based on this, better antenna gain and efficiency are obtained by the dielectric substrate 14 with low loss in coordination with the radiating metal portion 16 with high electrical conductivity (the patch radiator 161 and the microstrip feed-in wire 162) and the relatively large ground plane 18.

Referring to FIG. 1, FIG. 2, FIG. 3, and FIG. 4 together, the transparent metasurface layer 22 is located on an upper surface of the transparent panel 20, to be integrated on the transparent panel 20, so that the transparent metasurface layer 22 is located above the antenna radiation layer 12. The transparent metasurface layer 22 includes a transparent substrate 24 and a plurality of metasurface units 26. The transparent substrate 24 is disposed on the upper surface of the transparent panel 20. The plurality of metasurface units 26 is formed on the transparent substrate 24, and the metasurface units 26 are arranged in a matrix. In an embodiment, a quantity of the metasurface units 26 is at least 3*3, to cover the entire millimeter-wave bandwidth. In this embodiment, 3*4 metasurface units 26 are used as an example for description in detail. Each metasurface unit 26 is formed by a diamond-grid metal wire 261. In each metasurface unit 26, the diamond-grid metal wire 261 forms a rectangular portion 262, and two opposite sides of the rectangular portion 262 respectively extend outward to form a plurality of first extension portions 263 and a plurality of second extension portions 264. A quantity of the first extension portions 263 (such as 9 first extension portions 263) is greater than a quantity of the second extension portions 264 (such as 5 second extension portions 264). A distance between two adjacent first extension portions 263 is less than a distance between two adjacent second extension portions 264, and a width of each first extension portion 263 is less than a width of each second extension portion 264. In an embodiment, a material of the diamond-grid metal wire 261 is a silver alloy, which has an electrical conductivity of $5*10^5$ S/m. A line width of the diamond-grid metal wire 261 is 3.5 μm.

In an embodiment, in the transparent metasurface layer 22, a length of each metasurface unit 26 is 0.25 times a wavelength of a center frequency of 28 GHz (or the lowest operation frequency), and a distance between two adjacent metasurface units 26 is less than 0.1 times the wavelength of the center frequency of 28 GHz (or the lowest operation frequency).

In an embodiment, the electronic device is a notebook computer, a tablet computer, a mobile phone, a smartwatch, a personal digital assistant, or the like. In an embodiment, the display panel in the electronic device is an organic light-emitting diode (OLED) display.

Figure 3:
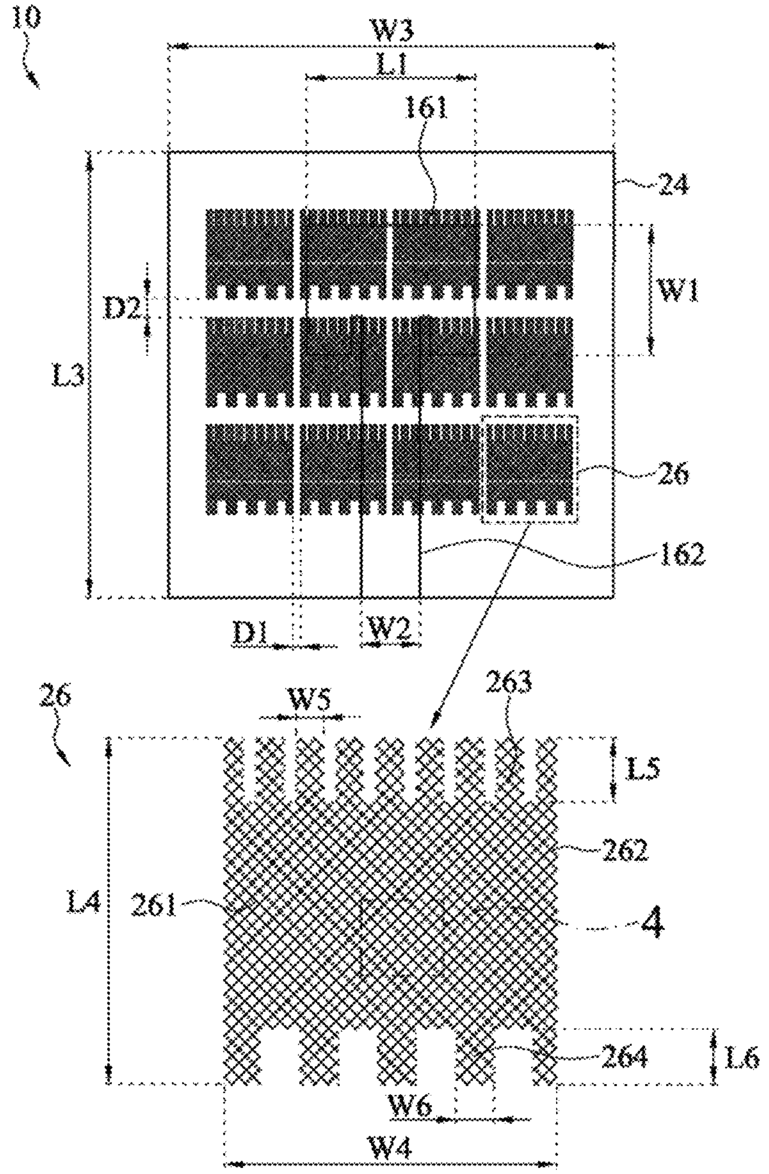
FIG. 3 is a structural top view of a transparent metasurface layer according to an embodiment of the disclosure.
Figure 4:
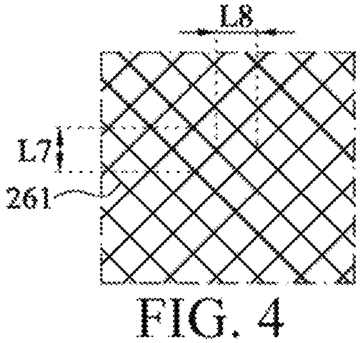
FIG. 4 is a schematic enlarged view of a partial structure of a metasurface unit in FIG. 3 according to the disclosure.

In an embodiment, to maximize effects of the radiating metal portion 12 and the transparent metasurface layer 22 above the radiating metal portion 12, overall dimensions and detailed dimensions of all parts are designed with corresponding dimensions. As shown in FIG. 3 and FIG. 4, a length dimension of the patch radiator 161 is about 0.5 times the wavelength of the center frequency of 28 GHz. In an embodiment, a first length L1 of the patch radiator 161 is 4.5 mm, a first width W1 of the patch radiator 161 is 3.5 mm, and a second width W2 of the microstrip feed-in wire 162 is 1.55 mm. A third length L3 of the transparent substrate 24 is 12 mm, and a third width W3 of the transparent substrate 24 is 12 mm. In the 3*4 metasurface units 26, a first distance D1 between two adjacent metasurface units 26 in each horizontal row is 0.22 mm, and a second distance D2 between two adjacent metasurface units 26 in each vertical row is 0.52 mm. A fourth length L4 of each metasurface unit 26 is 2.37 mm, and a fourth width W4 of each metasurface unit 26 is 2.28 mm. In each metasurface unit 26, a fifth length L5 of the first extension portion 263 is 0.47 mm, a fifth width W5 of the first extension portion 263 is 0.17 mm, a sixth length L6 of the second extension portion 264 is 0.38 mm, and a sixth width W6 of the second extension portion 264 is 0.28 mm. For two diagonal lines of a diamond formed in the diamond-grid metal wire 261, both a seventh length L7 of one of the diagonal lines and an eighth length L8 of the other diagonal line are 90 μm. For the above-mentioned dimensions, the foregoing embodiments are used as examples in the disclosure.

Figure 5:
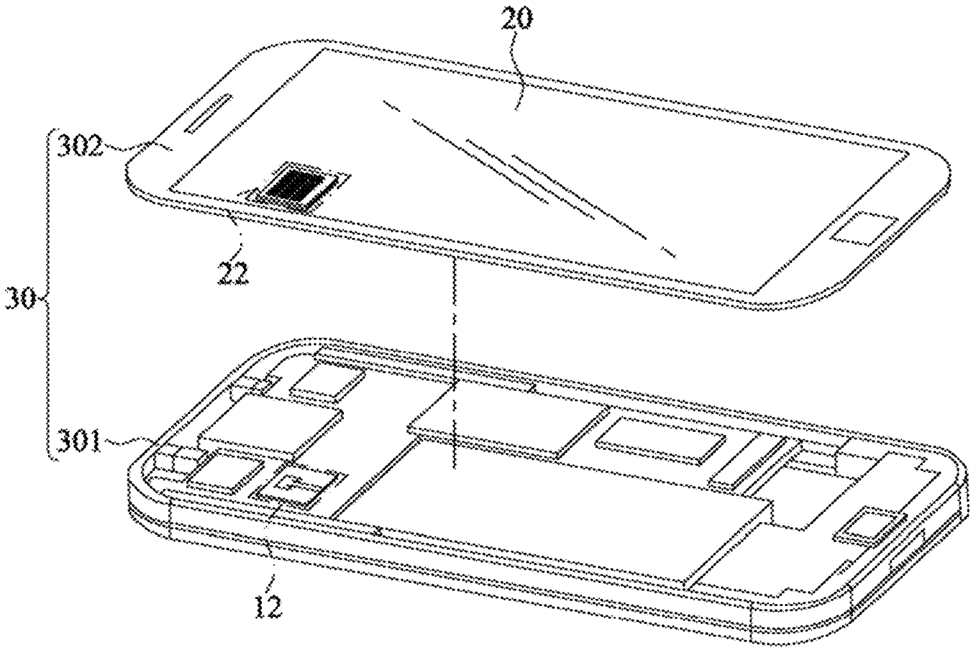
FIG. 5 is a schematic structural diagram of a wideband millimeter-wave antenna device mounted in an electronic device according to an embodiment of the disclosure.
Figure 6:
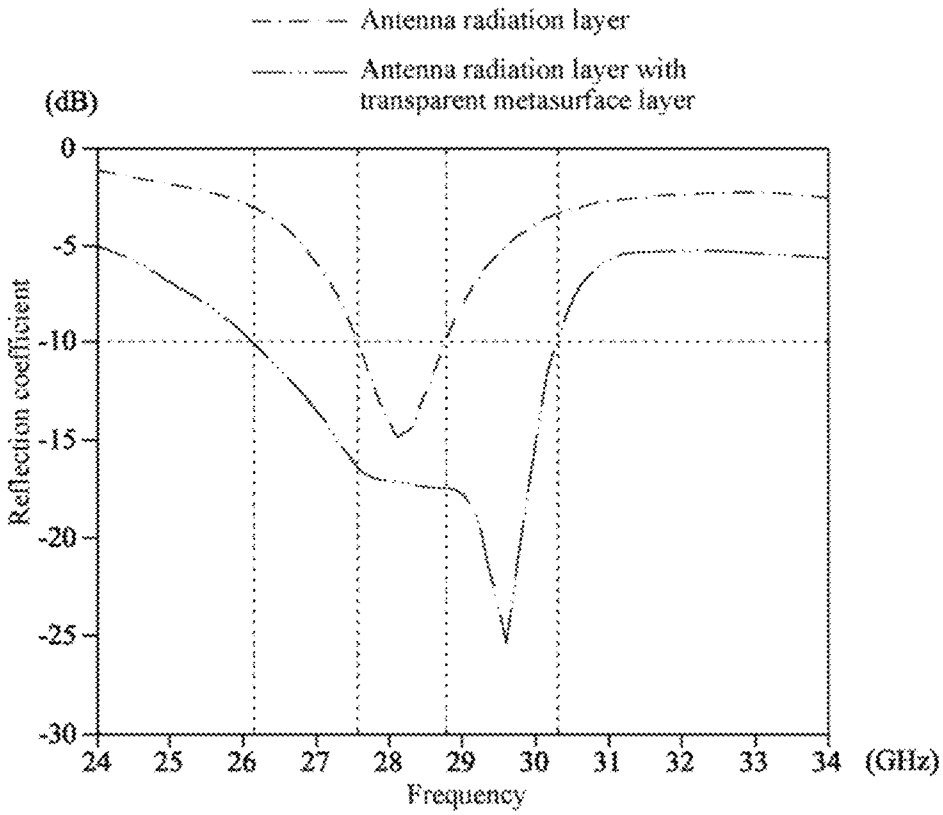
FIG. 6 is a schematic simulation diagram of reflection coefficients produced at frequencies of a wideband millimeter-wave antenna device with and without a transparent metasurface layer according to the disclosure.

Using the electronic device 30 being a mobile phone as an example, as shown in FIG. 5, the antenna radiation layer 12 is located in an available space of a body 301 of the electronic device (mobile phone) 30, so that the antenna radiation layer 12 is accommodated in the body 301 and located below the transparent panel 20 of the display panel in an upper cover 302. The transparent metasurface layer 22 is integrated on the transparent panel 20 and located on the upper surface of the transparent panel 20, so that the transparent metasurface layer 22 is located right above the antenna radiation layer 12. Therefore, the antenna radiation layer 12 in the disclosure is integrated inside the body 301 of the electronic device 30, and the transparent metasurface layer 22 is integrated on the transparent panel 20 of the electronic device 30, to form a complete wideband millimeter-wave antenna device 10 and to support the entire millimeter-wave bandwidth (26.5 GHz to 29.5 GHz).

The wideband millimeter-wave antenna device 10 provided in the disclosure has a relatively large bandwidth. Referring to FIG. 1 to FIG. 3 and FIG. 6 together, under the same experimental condition, in a case in which a reflection coefficient is −10 dB, the antenna radiation layer 12 with the transparent metasurface layer 22 in the disclosure has a bandwidth of about 4.2 GHz and a fractional bandwidth of 14.9%, but a control group only with the antenna radiation layer has a bandwidth of only 1.2 GHz and a fractional bandwidth of only 4.2%. Therefore, the structure design of the disclosure actually increases the antenna bandwidth.

Figure 7:
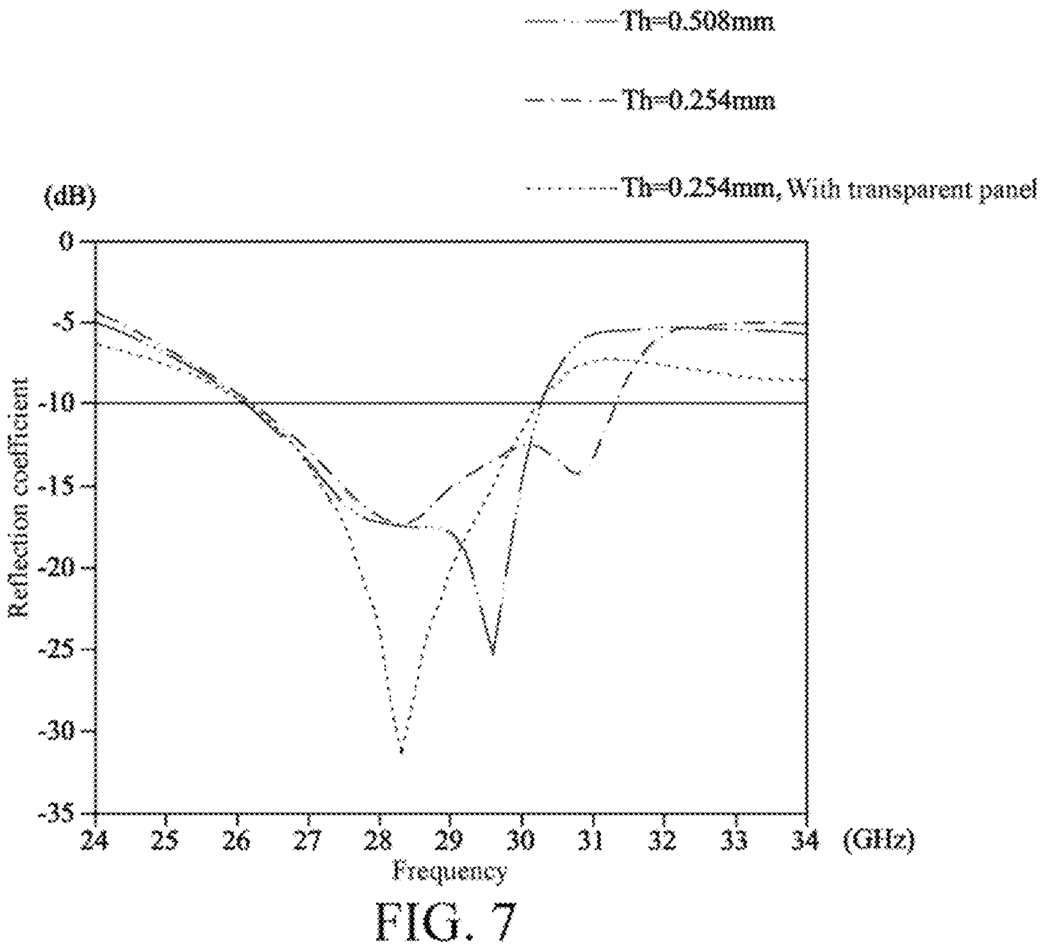
FIG. 7 is a schematic simulation diagram of reflection coefficients at frequencies of a wideband millimeter-wave antenna device under conditions of different thicknesses of transparent substrates according to the disclosure.

Referring to FIG. 1 to FIG. 3 and FIG. 7 together, in the transparent metasurface layer 22 of the wideband millimeter-wave antenna device 10 in the disclosure, the used transparent substrate 24 is a polymethyl methacrylate (PMMA) substrate. Using a thickness Th of the transparent substrate 24 as an example, antenna performances of the wideband millimeter-wave antenna device 10 under conditions of different thicknesses Th of the transparent substrate 24 are compared. As shown in FIG. 7, whether the thickness Th of the transparent substrate 24 is 0.508 mm or 0.254 mm, the reflection coefficient is less than −10 dB, satisfying the bandwidth ranging from 26.5 GHz to 29.5 GHz.

Figure 8:
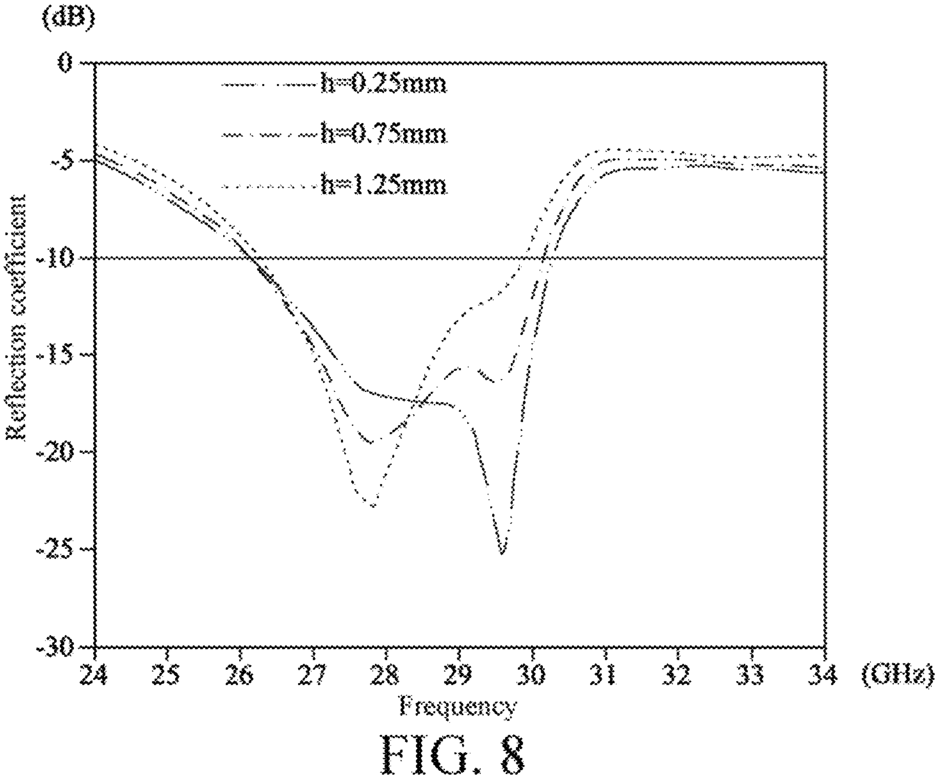
FIG. 8 is a schematic simulation diagram of reflection coefficients at frequencies of a wideband millimeter-wave antenna device under conditions of different spaced heights according to the disclosure.

Referring to FIG. 1 to FIG. 3 and FIG. 8 together, in the wideband millimeter-wave antenna device 10 in the disclosure, the spaced height h between the used antenna radiation layer 12 and transparent panel 20 is adjusted according to the available space inside the electronic device. Using the spaced height h as an example, antenna performances of the wideband millimeter-wave antenna device 10 under conditions of different spaced heights h are compared. As shown in FIG. 8, whether the spaced height h is 0.25 mm, 0.75 mm, or 1.25 mm, the reflection coefficient is less than −10 dB, satisfying the bandwidth ranging from 26.5 GHz to 29.5 GHz.

Figure 9A:
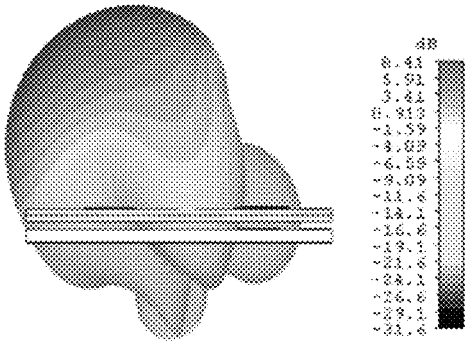
FIG. 9(A) is a schematic simulation diagram of a radiation pattern produced generated at a center frequency of 28 GHz of a wideband millimeter-wave antenna device with a transparent metasurface layer according to the disclosure.
Figure 9B:
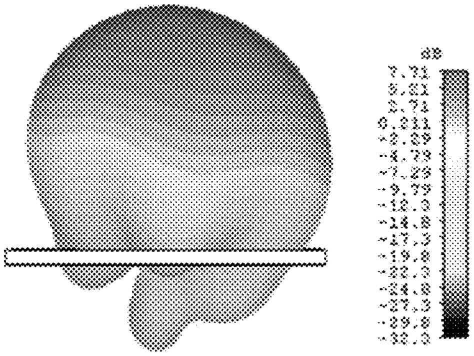
FIG. 9(B) is a schematic simulation diagram of a radiation pattern produced at a center frequency of 28 GHz of an antenna device without a transparent metasurface layer in a control group.

The wideband millimeter-wave antenna device 10 provided in the disclosure actually has a better gain. Referring to FIG. 1 to FIG. 3, FIG. 9(A), and FIG. 9(B) together, under the same simulated condition, in a case of the operation frequency being 28 GHz, as shown in FIG. 9(A), a gain of the wideband millimeter-wave antenna device 10 with the transparent metasurface layer 22 and the antenna radiation layer 12 in the disclosure is about 8.41 dBi. However, under the same operation frequency, a gain of the control group only with the antenna radiation layer is only 7.73 dBi, as shown in FIG. 9(B). Therefore, the structure design of the disclosure actually increases the antenna gain.

In summary, the disclosure provides a wideband millimeter-wave antenna device, which reduces the overall dimension of the antenna, and decreases the complexity of shape design using the design concept of a transparent metasurface layer, without affecting radiation characteristics of the antenna. In addition, the entire antenna device has a wider operation bandwidth, and has the best antenna gain and antenna radiation efficiency, to obtain the best antenna radiation characteristics.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. A wideband millimeter-wave antenna device, comprising:

an antenna radiation layer, located below a transparent panel of a display panel, and maintaining a spaced height from the transparent panel, wherein the antenna radiation layer comprises:

a dielectric substrate, located below the transparent panel, wherein the dielectric substrate comprises a first surface and a second surface opposite to each other, so that the first surface faces the transparent panel;

a radiating metal portion, located on the first surface; and a ground plane, located on the second surface; and a transparent metasurface layer, located on an upper surface of the transparent panel, wherein the transparent metasurface layer comprises:

a transparent substrate, located on the upper surface of the transparent panel; and a plurality of metasurface units, located on the transparent substrate, wherein each metasurface unit is formed by a diamond-grid metal wire.

2. The wideband millimeter-wave antenna device according to claim 1, wherein the radiating metal portion further comprises a patch radiator and a microstrip feed-in wire connected to the patch radiator.

3. The wideband millimeter-wave antenna device according to claim 1, wherein the ground plane covers on the entire second surface.

4. The wideband millimeter-wave antenna device according to claim 1, wherein the metasurface units are arranged in a matrix.

5. The wideband millimeter-wave antenna device according to claim 4, wherein a quantity of the metasurface units is at least 3*3.

6. The wideband millimeter-wave antenna device according to claim 1, wherein in each metasurface unit, the diamond-grid metal wire forms a rectangular portion.

7. The wideband millimeter-wave antenna device according to claim 6, wherein, in each metasurface unit, the diamond-grid metal wire extends outward from two opposite sides of the rectangular portion to form a plurality of first extension portions and a plurality of second extension portion.

8. The wideband millimeter-wave antenna device according to claim 7, wherein a quantity of the first extension portions is greater than a quantity of the second extension portions, a distance between two adjacent first extension portions is less than a distance between two adjacent second extension portion, and a width of each first extension portion is less than a width of each second extension portion.

9. The wideband millimeter-wave antenna device according to claim 1, wherein a material of the diamond-grid metal wire is silver alloy.

10. The wideband millimeter-wave antenna device according to claim 1, wherein a length of each metasurface unit is 0.25 times a wavelength of an operation frequency.

11. The wideband millimeter-wave antenna device according to claim 1, wherein a distance between two adjacent metasurface units is less than 0.1 times a wavelength of an operation frequency.

12. The wideband millimeter-wave antenna device according to claim 1, wherein a line width of the diamond-grid metal wire is 3.5 μm.

* * * * *